United States Patent
Hochwald et al.

(10) Patent No.: US 8,737,529 B2
(45) Date of Patent: May 27, 2014

(54) MULTIPLE ANTENNA SIGNAL TRANSMISSION

(75) Inventors: Bertrand M. Hochwald, Santa Clara, CA (US); Robert G. Lorenz, Santa Clara, CA (US); Derek K. Shaeffer, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 187 days.

(21) Appl. No.: 12/689,058

(22) Filed: Jan. 18, 2010

(65) Prior Publication Data

US 2011/0176635 A1    Jul. 21, 2011

(51) Int. Cl.
*H04L 27/00* (2006.01)
(52) U.S. Cl.
USPC .......... 375/299; 375/219; 375/220; 375/221; 375/222; 375/260; 375/267; 375/295; 375/296; 375/297; 455/101; 455/114.3; 455/127.1; 455/132; 455/500; 455/562.1; 370/334; 370/464; 370/480; 341/173; 341/180; 330/149
(58) Field of Classification Search
USPC ......... 375/219, 220, 221, 222, 260, 267, 295, 375/296, 297, 299; 455/101, 114.3, 127.1, 455/132, 500, 562.1; 370/334, 464, 480; 341/173, 180; 330/149
See application file for complete search history.

(56) References Cited

U.S. PATENT DOCUMENTS

| | | | |
|---|---|---|---|
| 4,612,548 | A | 9/1986 | Beltran |
| 5,412,414 | A | 5/1995 | Ast et al. |
| 5,530,449 | A | 6/1996 | Wachs et al. |
| 5,581,548 | A | 12/1996 | Ugland et al. |
| 6,320,540 | B1 | 11/2001 | Meredith |

(Continued)

FOREIGN PATENT DOCUMENTS

| | | |
|---|---|---|
| EP | 1 198 151 A2 | 4/2002 |
| EP | 1 487 140 A1 | 12/2004 |

(Continued)

OTHER PUBLICATIONS

International Search Report for International Application No. PCT/US2011/021536, United States Patent and Trademark Office, United States, mailed on Apr. 4, 2011.

(Continued)

*Primary Examiner* — Leon Flores
(74) *Attorney, Agent, or Firm* — Sterne, Kessler, Goldstein & Fox P.L.L.C.

(57) ABSTRACT

Embodiments for at least one method and apparatus of transmitting a transmission signal through a plurality of antennas are disclosed. One method includes generating at least one dynamically adjustable phase shifted signal from the transmission signal. The transmission signal and the at least one dynamically adjustable phase shifted signal are separately amplified. The amplified transmission signal and the amplified at least one dynamically adjustable phase shifted signal are combined within a multiport network. An output signal for each of the plurality of antennas is generated by the multiport network.

29 Claims, 12 Drawing Sheets

(56) References Cited

U.S. PATENT DOCUMENTS

| | | |
|---|---|---|
| 6,453,150 B1 | 9/2002 | Yamamoto et al. |
| 7,154,442 B2 | 12/2006 | van Wonterghem et al. |
| 7,245,257 B1 * | 7/2007 | Bruce et al. .................. 342/372 |
| 7,248,216 B2 | 7/2007 | Akiyama et al. |
| 7,280,515 B2 * | 10/2007 | Ranta ............................ 370/337 |
| 7,286,855 B2 | 10/2007 | Raleigh et al. |
| 7,308,705 B2 | 12/2007 | Gordy et al. |
| 7,324,794 B2 | 1/2008 | Chari et al. |
| 7,450,065 B1 * | 11/2008 | Bruce et al. .................. 342/360 |
| 7,616,704 B2 | 11/2009 | Li et al. |
| 8,055,216 B2 * | 11/2011 | Dent .......................... 455/114.2 |
| 2003/0179138 A1 | 9/2003 | Chen |
| 2004/0017326 A1 | 1/2004 | Merrill |
| 2004/0228422 A1 * | 11/2004 | Silveira et al. ................ 375/299 |
| 2006/0073802 A1 | 4/2006 | Chari et al. |
| 2007/0135168 A1 | 6/2007 | Liu |
| 2007/0173277 A1 | 7/2007 | Yun |
| 2007/0222677 A1 | 9/2007 | Strong |
| 2008/0153433 A1 | 6/2008 | Pallonen et al. |
| 2008/0291083 A1 | 11/2008 | Chang |
| 2009/0005120 A1 * | 1/2009 | Ylitalo ....................... 455/562.1 |
| 2010/0214017 A1 | 8/2010 | Couchman et al. |
| 2011/0195670 A1 | 8/2011 | Dakshinamurthy et al. |
| 2011/0201283 A1 | 8/2011 | Lorenz et al. |
| 2013/0017858 A1 | 1/2013 | Lorenz et al. |
| 2013/0230005 A1 | 9/2013 | Dakshinamurthy et al. |

FOREIGN PATENT DOCUMENTS

| | | |
|---|---|---|
| EP | 1 775 854 A1 | 4/2007 |
| EP | 2 009 811 A1 | 12/2008 |
| JP | 10-336087 A | 12/1998 |
| WO | WO 2009/078529 A1 | 6/2009 |
| WO | WO 2010/108772 A1 | 9/2010 |
| WO | WO 2011/088452 A1 | 7/2011 |
| WO | WO 2011/097651 A1 | 8/2011 |
| WO | WO 2011/097652 A1 | 8/2011 |

OTHER PUBLICATIONS

International Search Report for International Application No. PCT/US2011/024111, United States Patent and Trademark Office, United States, mailed on May 6, 2011.

Written Opinion directed toward International Application No. PCT/US2011/024111, United States Patent and Trademark Office, United States, mailed on May 6, 2011.

International Preliminary Report directed toward International Application No. PCT/US2011/024111, The International Bureau of WIPO, United States, issued on Aug. 14, 2012.

Written Opinion directed toward International Application No. PCT/US2011/021536, United States Patent and Trademark Office, United States, mailed on Apr. 4, 2011.

International Preliminary Report on Patentability directed toward International Application No. PCT/US2011/021536, The International Bureau of WIPO, Geneva, Switzerland, United States, mailed on Jul. 24, 2012.

International Search Report directed toward International Application No. PCT/US2011/024112, United States Patent and Trademark Office, United States, mailed on Apr. 1, 2011.

Written Opinion directed toward International Application No. PCT/US2011/024112, United States Patent and Trademark Office, United States, mailed on Apr. 1, 2011.

International Preliminary Report on Patentability directed toward International Application No. PCT/US2011/024112, The International Bureau of WIPO, United States, issued on Aug. 14, 2012.

Supplementary European Search Report for European Application No. 11740548.0, mailed Jul. 26, 2013, 3 pages.

Tatu, et al., "Low-Cost Transceiver Architectures for 60 GHz Ultra Wideband WLANs", Interntaional Journal of Digital Multimedia Broadcasting, vol. 2009, Article ID 382695, 7 pages.

Supplementary European Search Report for European Application No. 11740549.8, mailed Jul. 24, 2013, 6 pages.

European Search Report for European Application No. 12 00 0491, dated Dec. 2, 2013, 5 pages.

* cited by examiner

MULTIPLE ANTENNA SIGNAL TRANSMISSION

FIELD OF THE DESCRIBED EMBODIMENTS

The described embodiments relate generally to wireless communications. More particularly, the described embodiments relate to multiple antenna signal transmission.

BACKGROUND

Conventional wireless systems employ radio-frequency (RF) transmitters to produce an output signal that can be applied to an antenna for communication between stations separated by some distance. In mobile wireless networks, one station may be a mobile station (MS), whereas another station may be a base station (BS). As the MS roams throughout the coverage area of the wireless network, the path loss between the MS and the BS changes due to a number of factors including the change in distance between the stations as well as the presence of objects in the environment that serve to obstruct or attenuate the signals traveling from one station to the other.

To ensure proper network operation, the BS instructs the MS to increase or decrease its transmit power as required to overcome the path loss between the MS and BS so that the BS will continue to receive the MS signals as channel conditions change. Over the full range of possible transmit powers, the MS must maintain a certain signal quality so as not to inhibit detection of its transmit signals by the BS. Depending upon the details of the physical environment between the MS and BS, at some critical distance from the BS the MS will no longer be able to increase its output power while maintaining the required signal quality. At that point, communication between the MS and BS can no longer be maintained and the link will be dropped unless the BS is able to hand-off communication with the MS to a neighboring BS. Therefore, the maximum output power capability of the MS is a critical parameter that ultimately determines the expected distance over which the MS and BS can communicate and thereby the number and spacing of BS sites that is required to provide reliable coverage in a mobile network. However, the greater the number of BS sites, the greater the cost to implement the mobile network. Accordingly, there is a need to maximize the output power capability of the MS to ensure reliable coverage with a minimum of required BS sites.

Therefore, a critical component in a MS is the power amplifier that is used to transmit the signal to the BS. A power amplifier typically has a maximum output power rating. One method to attain reliable communication with a BS is to ensure that the power amplifier is equipped with sufficient power to overcome the fading and otherwise poor environment that is sometimes present in a wireless medium.

However, it is not always feasible to equip an MS with a high-power amplifier for several reasons: (i) there is a limit on the total power that may be consumed by the device; (ii) a high-power amplifier may get excessively warm and be inefficient; (iii) a high-power amplifier may be expensive; (iv) a high-power amplifier may be too large to fit within the size constraints of a small mobile terminal.

In an effort to increase the output power of the MS, rather than increase the power of an existing amplifier, it is sometimes economical and efficient to combine one or more lower-power amplifiers. At this point, the decision becomes what to do with the output of the multiple amplifiers.

It is desirable to have a method of optimizing transmission power of multiple power amplifiers of subscriber station transceivers that have multiple antennas.

SUMMARY

An embodiment includes a method of transmitting a transmission signal through a plurality of antennas. The method includes generating at least one dynamically adjustable phase shifted signal from the transmission signal. The transmission signal and the at least one dynamically adjustable phase shifted signal are separately amplified. The amplified transmission signal and the amplified at least one dynamically adjustable phase shifted signal are combined with a multiport network. An output signal for each of the plurality of antennas is generated by the multiport network.

Another embodiment includes a transmitter. The transmitter includes a means for generating at least one dynamically adjustable phase shifted signal from a transmission signal. A first amplifier amplifies the transmission signal and a second amplifier amplifies the at least one dynamically adjustable phase shifted signal. A multiport network combines the amplified transmission signal and the amplified at least one dynamically adjustable phase shifted signal, and generates an output signal for each of the plurality of antennas.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses of a transceiver combining multiple transmission signals wherein the process of combining provides a natural selection of a subset of a plurality of a plurality of transceiver antennas in which transmission signal power is allocated.

Figure 1:
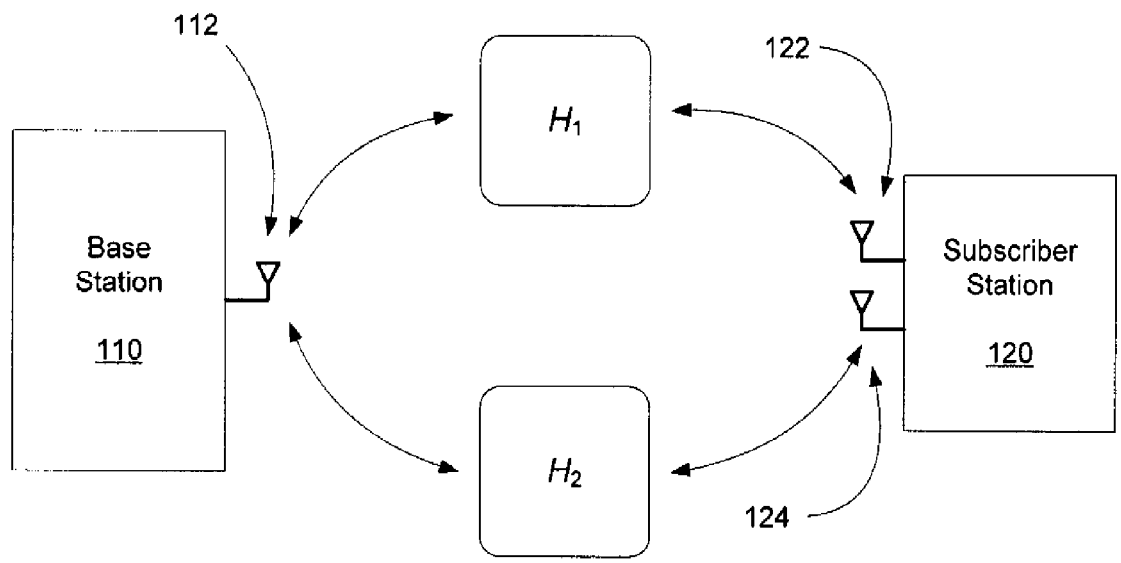
FIG. 1 shows an example of a base station and a subscriber station transceiver, wherein multiple propagation channels are formed between a base station antenna and each subscriber station antenna.

FIG. 1 shows an example of a base station 110 and a subscriber station transceiver 120, wherein multiple propagation channels $H_1$, $H_2$, are formed between each base station antenna 112 and each subscriber station antenna 122, 124. It is to be understood, however, the base station 110 can include multiple antennas, and the subscriber transceiver 120 can include more than two antennas.

A wireless communication signal traveling from the base station 110 to the subscriber station 120 is typically referred to as "downlink transmission", and a wireless communication signal traveling from the subscriber station 120 to the base station 110 is typically referred to as "uplink transmission". The transmissions can be included within a frame that includes a downlink sub-frame and an uplink subframe.

Some embodiments include the base station of the wireless system scheduling the wireless communication and the scheduling is communicated to subscriber stations through a control channel. The control channel can provide scheduling allocations, which for a multi-carrier system (such as an orthogonal frequency division multiplexing (OFDM)), designates sub-carriers and time intervals in which downlink and uplink transmissions between the base station and each mobile subscriber are to occur.

The control channel may be transmitted to the subscriber station within a downlink sub-frame. Embodiments of the downlink sub-frame may additionally include a preamble. The preamble can occur at the beginning of every frame. Embodiments of the preamble include pilot tones (generally referred to as pilots) being closely spaced across carriers of a multi-carrier signal. For example, one embodiment includes the pilots occurring at every third tone across the frequency spectrum of a multi-carrier signal. The pilots in the preamble can be transmitted at a higher power spectral density and contain modulation known to the receiver (subscriber station) as compared to data carrying subcarriers. These pilots can be used by communication systems to estimate the channel and/or to correct frequency and timing offsets.

Figure 2:
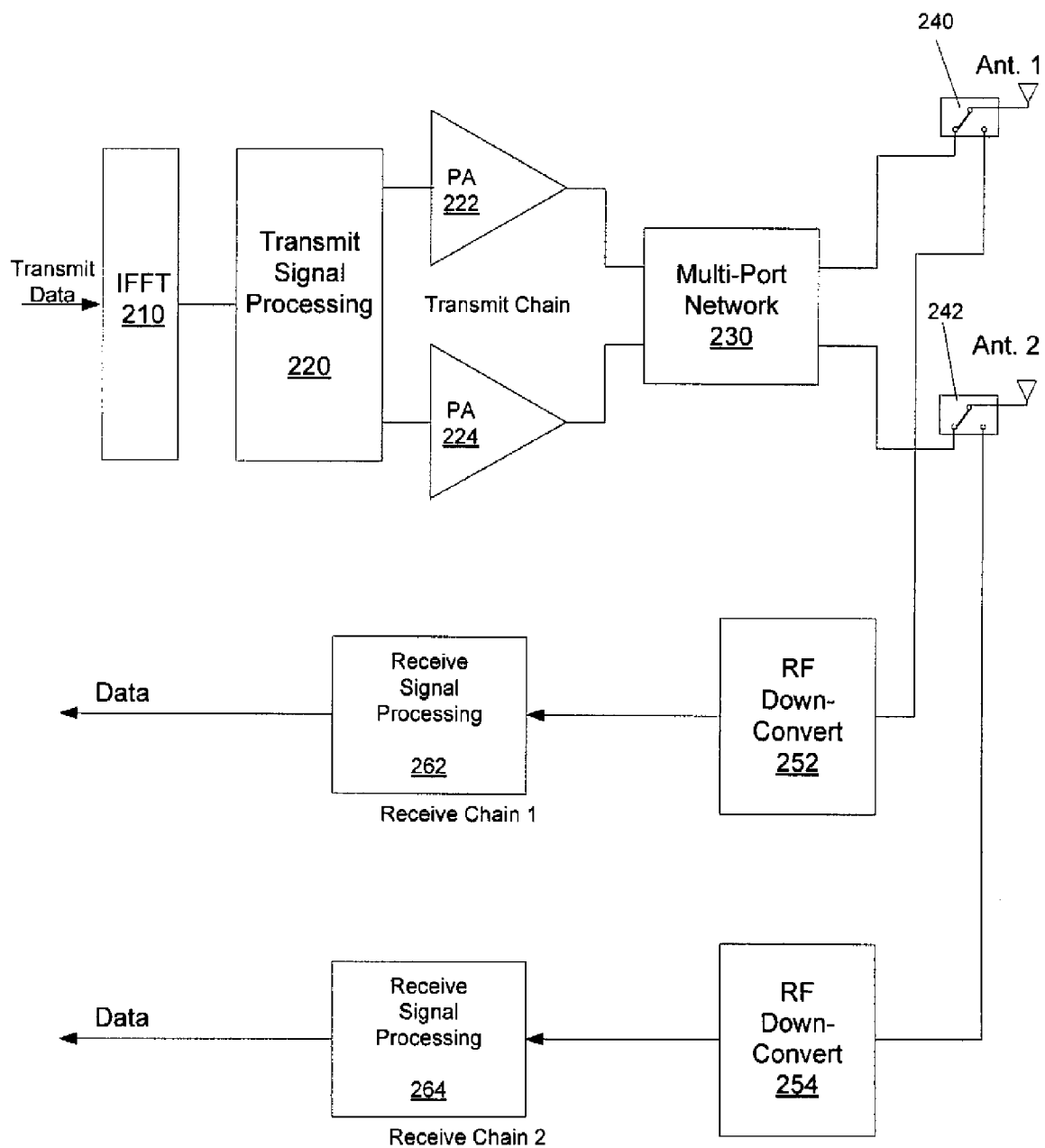
FIG. 2 shows an example of a block diagram of subscriber station transceiver that includes a multiport network, and multiple antennas.

FIG. 2 shows an example of a block diagram of subscriber station transceiver that includes a multipart network, and multiple antennas. For this example, the transmitter component of an OFDM transmitter is used in a mobile station (MS). The symbol data (for example, Transmit Data) which is processed through a transmitter chain before transmission is applied to an input IFFT circuit 210. The IFFT circuit 210 implements an inverse Fast-Fourier transform (IFFT). Transmit Signal Processing circuit 220 scales and upconverts the IFFT output. The scaled and upconverted signals are amplified by power amplifiers 222, 224 and applied to a multipart network 230. An embodiment of the multiport network includes a hybrid coupler which will be described later. Outputs of the multiport network 230 are applied to transmit antennas Ant1, Ant2 through switches 240, 242.

The transmit data is preprocessed to establish phase relationships between the amplified signals received by the multiport network 230. The phase relationships can be selected on a subcarrier by subcarrier basis. Additionally, or alternatively, the phase relationships can be selected temporally. The selection of the phase relationships in combination with the multiport network 230, essentially results in a selection of one of the transmit antennas (Ant. 1, Ant. 2) in which the majority of the transmission signal power is directed. As described, the number of antenna is not limited, and the subset of antennas in which the signal power is directed is not limited to one. As described, the antenna selection can be adaptively made over both subcarriers and time (symbols).

The switches 240, 242 provide connections between the two antennas Ant. 1, Ant. 2, the transmit chains 1,2 and the receiver chains 1, 2.

Embodiments of the receive chains include (receive chain 1, receive chain 2) RF frequency downconverters 252, 254, frequency translators, analog lowpass filters, analog to digital converters (ADCs) and signal processors 262, 262. The receive chains generate received baseband signals, and with signal processing, generate Data, and the channel estimates (for example, vectors $H_1$, $H_2$).

Figure 3:
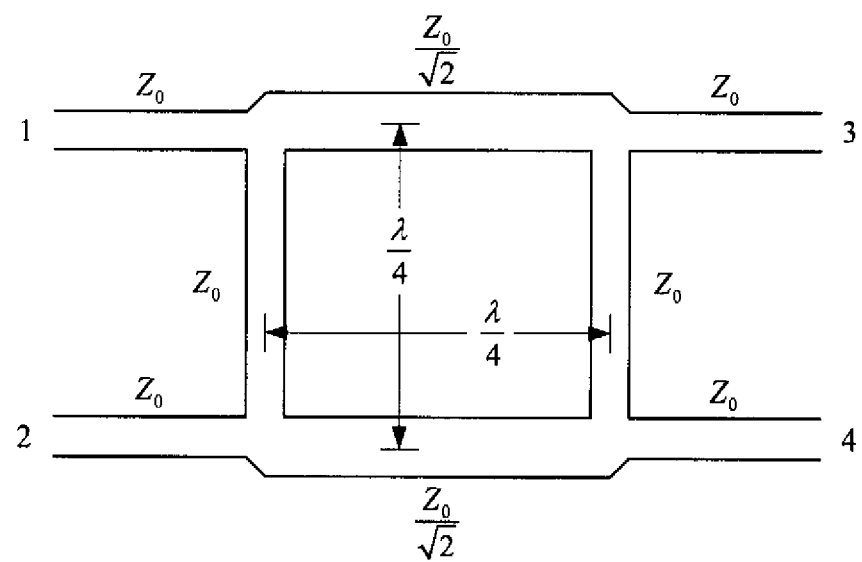
FIG. 3 shows an example of an implementation of a multipart network.

FIG. 3 shows a schematic of an example of an embodiment of a multiport network. More specifically, FIG. 3 shows a 90 degree hybrid coupler. For this exemplary embodiment, consider ports 1 and 2 to be inputs and ports 3 and 4 to be outputs. The hybrid coupler may be realized using transmission lines with electrical lengths and characteristic impedances as shown. Here, $Z_0$ denotes a characteristic impedance, typically 50 ohms;

$$\frac{\lambda}{4}$$

is a quarter wavelength line at the transmit center frequency.

The 90 degree hybrid coupler has nominal scattering parameters given by $$[S] = \frac{-1}{\sqrt{2}} \begin{bmatrix} 0 & j & 1 & 0 \\ j & 0 & 0 & 1 \\ 1 & 0 & 0 & j \\ 0 & 1 & j & 0 \end{bmatrix} \quad (1.1)$$

Let $$x = \begin{bmatrix} x_1 \\ x_2 \end{bmatrix}$$

be inputs to the hybrid, wherein $x_1$ denotes the signal applied to port 1 and $x_2$, the signal applied to port 2. Similarly, let $$y = \begin{bmatrix} y_1 \\ y_2 \end{bmatrix}$$

be outputs to the hybrid, wherein $y_1$ denotes the signal present at port 3 and $y_2$, the signal present at port 4. Using equation (1.1), the nominal relationship between inputs x and outputs y is seen to be:

$$y = \frac{-1}{\sqrt{2}} \begin{bmatrix} j & 1 \\ 1 & j \end{bmatrix} x.$$

For an embodiment, the output ports 3, 4 are connected to antennas of a transmitter (for example, Ant1, Ant2 of a subscriber unit) during actual operation. The outputs (also referred to as antenna ports 1 and 2) may alternately be connected to instrumentation during testing or calibration. For the following discussion it is assumed that the transmitter is in actual operation and communicating, for example, with an uplink base station over a wireless channel. It is to be understood, however, that the described embodiments can be applied to other forms of operation and to receivers other than a base station. Additionally, a base station receiver is used for at least some of the exemplary illustration and examples of the effects of the described embodiments.

Assume power amplifier 222 and power amplifier 224 are each capable of transmitting with power P and that it is desirable to transmit a signal s(f) on Antenna Port 1 with power 0.2P. This can be achieved by applying a vector signal, $$x(f) = \begin{bmatrix} j \\ -1 \end{bmatrix} s(f)$$

to the inputs to a hybrid coupler. Here the index f represents the subcarrier in the frequency domain.

For a general multiport network, the vector signal at its input can be written:

$$x(f) = w(f) \cdot s(f)$$

wherein a weight vector w(f) is a function of the subcarrier index f. The weight vector w(f) has dimension equal to the number of multiport network inputs. It is to be understood that although the signals are represented in the frequency domain, it is typical for such signals to be converted to a time-domain representation before being transmitted. FIG. 2 shows an example of this conversion.

For convenience, the losses in the hybrid have been neglected, although in practice a hybrid is usually not lossless. The power amplifiers are generally fed with an attenuated version of the inputs applied to the hybrid.

FIG. 2 shows an example of radio-frequency circuitry connected to power amplifiers in an Orthogonal Frequency-Division Multiplexing (OFDM) system, where the data s(f) is typically applied at the input of the IFFT (inverse FFT) block 210, and converted into a time-domain signal before being fed into the hybrid.

To transmit s(f) with full power 2P at Antenna Port 2, the vector signal $$x(f) = \begin{bmatrix} -1 \\ j \end{bmatrix} s(f)$$

can be fed into the input of the hybrid as the output of the power amplifiers 222, 224.

It is assumed that the power amplifiers are capable of delivering power P on subcarrier f. This is for illustration, and does not preclude the power amplifier from being able to deliver additional, possibly different, powers on other subcarriers. The total power delivered by each amplifier is then the power per subcarrier multiplied by the total number of subcarriers. Typically, it is expected that the power per subcarrier delivered by the amplifier is the same across subcarriers, but this does not have to be so.

It can be advantageous to transmit some symbols with full power on one port for some frequencies, and other symbols with full power on another port for other frequencies. This is especially applicable for an OFDM system, where symbols are typically assigned to individual subcarriers. One algorithm for implementing this is as follows.

Let $T_1$ be a set of subcarrier frequencies grouped according to convenience or according to a wireless communications standard as an indivisible unit, and being denoted as Tile 1. Let $T_2$ (Tile 2) be another set of frequencies such that $T_1 \cap T_2 = \emptyset$. That is, for every $f_1 \in T_1$, $f_1 \notin T_2$; and conversely for $f_2 \in T_2$, $f_2 \notin T_1$.

A measure $p_1(f) > 0$ can be defined as measure the signal strength between the MS Antenna Port 1 and the BS on a frequency f. The larger $p_1(f)$ is for a given f the better the connection between Antenna Port 1 and the basestation. A similar signal strength measurement on Antenna Port 2 can be denoted as $p_2(f) > 0$. Define $$t_n = \left\{ \sum_{f \in T_n} p_1(f) > \sum_{f \in T_n} p_2(f) \right\} \tag{1.2}$$

where the notation { } denotes an indicator function that is "1" if the event in brackets is true and is "0" otherwise. Denoting $t_n$ as the Antenna Subset Indicator for tile $T_n$. In the case of (1.2), $t_n = 1$ if Antenna Port 1 has the better total signal strength than Antenna Port 2 on tile $T_n$, and $t_n = 0$ otherwise.

Defining N tiles, $T_1, \ldots T_N$, and letting $t_1, \ldots, t_N \in \{0,1\}$ be indicators of whether the signal strengths between Antenna Port 1 and the BS is better than Antenna Port 2 and the BS on these tiles. Then one possible transmission scheme is to let $$x(f) = \left( \begin{bmatrix} j \\ -1 \end{bmatrix} t_n + \begin{bmatrix} -1 \\ j \end{bmatrix} (1 - t_n) \right) s(f) \text{ for } f \in T_n \tag{1.3}$$

For any $f \in T_n$ this scheme transmits the signal s(f) on the Antenna Port whose signal-strength to the BS is best as summed over frequencies in $T_n$. This can be referred to as Hybrid Tile-Order Switching. Equation (1.3) can be written more compactly as $$x(f) = \begin{bmatrix} 1 \\ j^{1+2(1-t_n)} \end{bmatrix} s(f) \text{ for } f \in T_n$$

Some comments on the choice of tiles $T_1, \ldots T_N$. Let F denote the set of subcarriers that are to be used for transmission. The tiles are chosen such that all of the subcarrier frequencies to be used for transmission appear in one (and no more than one) of the tiles, or $$F = \bigcup_{n=1}^{N} T_n$$

and $T_m \cap T_n = \emptyset$ for $m \neq n$. The tiles may additionally be chosen such that the BS receiving the transmission from the MS treats each $T_n$ as an indivisible unit for the purposes of estimating the channel between the MS and the BS. This is the notion of a Tile as defined in the WiMax 802.16 wireless communication standard, where pilot signals for channel estimation are an integral part of each tile. A notional equivalent to the Tile exists in the 3GPP LTE standard, where the equivalent term is Physical Resource Block. The transmission scheme (1.3) ensures that subcarriers in each $T_n$ are not divided amongst different Antenna Ports.

An important special case is where there is only one tile covering the entire band of interest. In this case, the Antenna Port is chosen whose signal strength over the entire frequency band is largest.

The described embodiments are not limited to hybrid couplers with four ports, nor are they limited to systems with just two Antenna Ports. The Antenna Selection Indicator Function (1.2) can be readily generalized to more than two antennas. For example $$t_n = \arg\max_{m=1,\dots M} \sum_{f \in T_n} p_m(f)$$

is a useful Antenna Subset Indicator in a system with M Antenna Ports.

The examples provided have been confined to Antenna Subset Indicators that take on only one value, but we may also define the Indicator to select a subset of the total available Antenna Ports. This may be useful if transmission from more than one antenna at once is desired, using multiple-antenna methods such as Cyclic Delay Diversity (CDD), or space-time coding.

The metric $p_m(f)$ can be chosen in a variety of ways. One way is to measure the receive signal power on the mth antenna on subcarrier frequency f. This is especially useful in a time-division-duplex (TDD) system, where the receive power is an excellent proxy for the connectivity of that antenna and the BS during transmission. The higher the receive power, the better the connectivity. Other methods include channel-quality feedback mechanisms provided by a BS that indicate the connectivity between the MS and the BS.

The described embodiments achieve robustness against signal loss by allowing the MS to choose the antenna to transmit based on its measure of connectivity to the BS. The antennas with the best connectivity on a given set of frequencies are those chosen to transmit from.

Figure 4:
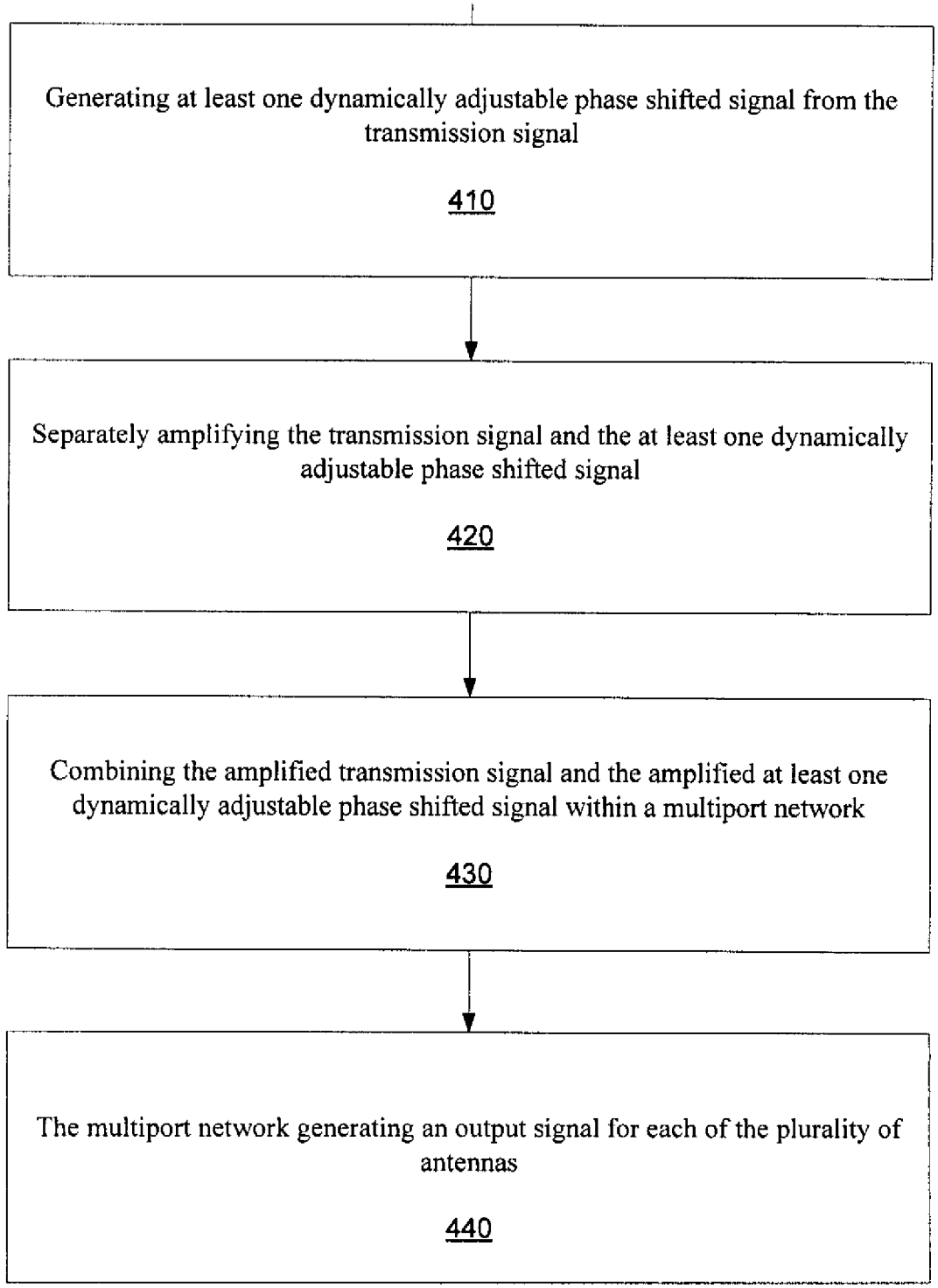
FIG. 4 shows a flow chart that includes steps of an example of a method of transmitting a plurality of transmission signals, wherein transmission signal energy is directed to a subset of a plurality of antennas.

FIG. 4 shows a flow chart that includes steps of an example of a method of transmitting a plurality of transmission signals, wherein transmission signal energy is directed to a subset of a plurality of antennas. A first step 410 includes generating at least one dynamically adjustable phase shifted signal from the transmission signal. A second step 420 includes separately amplifying the transmission signal and the at least one dynamically adjustable phase shifted signal. A third step 430 includes combining the amplified transmission signal and the amplified at least one dynamically adjustable phase shifted signal within a multiport network. A fourth step 440 includes the multiport network generating an output signal for each of the plurality of antennas.

An embodiment includes the at least one dynamically adjustable phase shifted signal being generated by dynamically adjusting at least one phase relationship of the transmission signal. That is, a second signal (or more) is generated that has a phase that differs from the transmission signal by the dynamically adjustable phase. The amplitude of the second (or more) signal may differ from the transmission signal for various reasons including amplitude imbalances in RF circuitry and the multiport network.

An embodiment includes directing a majority of signal power of the combined signals to a subset of the plurality of antennas, on a frequency selective basis, as determined by the adjusting of the at least one phase relationship between the transmission signal and the at least one dynamically adjustable phase shifted signal. This method may include determining a receiver antenna with the strongest receive signal and selecting that antenna for transmission. For this implementation, the desired antenna (or desired antennas) can effectively be selected (majority of signal power directed to) without having to physically switch and direct signal energy to the desired antenna. The phase relationships between the transmission signal and the dynamically adjustable phase shifted signal, and the combining of these signals within the multi-port network results in direction of the combined signal energy to a subset of the plurality of antennas.

An embodiment includes the subset of plurality of antennas that the majority of signal power of the combined signals is directed being adaptively selected over time. That is, for example, the above-described antenna selection can be adaptively adjusted over time.

An embodiment includes the transmission signal and the at least one dynamically adjustable phase shifted signal being multi-carrier signals. Each of the multi-carrier signals includes a plurality of sub-carriers. Further, this embodiment can include adaptively directing signal power of the combined signals to a subset of plurality of antennas on a subcarrier-by-subcarrier basis. The subcarrier-by-subcarrier signal power direction can be determined by the adjusting of the at least one phase relationship between the transmission signal and the at least one dynamically adjustable phase shifted signal. Clearly, the signal power can additionally be adaptive over time as well.

For an embodiment, the multi-port network includes a hybrid coupler that combines the amplified transmission signal and the amplified at least one dynamically adjustable phase shifted signal, and generates an output signal for each of the plurality of antennas. More generally, the multipart network includes combining the amplified transmission signals that includes delaying each amplified transmission signal before combining, wherein the delays are predetermined, generating a plurality of combined outputs, a combined output corresponding with each of the plurality of antennas.

An embodiment includes controlling the phase relationship between the transmission signal and the at least one dynamically adjustable phase shifted signal based on characterizing transmission channel qualities associated with each of the plurality of antennas. That is, adaptive selection the subset of the plurality of antennas that the signal power of the combined signals is directed is based on the characterized channel qualities. For an embodiment, the transmission channel qualities are characterized across the subcarriers of the multi-carrier signals. An embodiment includes characterizing the transmission channel qualities based on reception of signals through each antenna.

The transmission can include tiles that include multiple subcarriers of multiple multi-carrier symbols. An embodiment includes adaptively selecting the subset of the plurality of antennas that the majority of the signal power of the combined signals is directed based on a tile-by-tile basis.

For an embodiment, transmission channel qualities associated with each of the antennas includes characterizing pilot tones of a preamble of a downlink sub-frame of the at least one received signal. For a specific embodiment, characterizing the pilot tones of the preamble is based on subcarriers of the preamble corresponding to a group of subcarriers to be allocated during transmission. For another specific embodiment, characterizing the pilot tones of the preamble occurs over a range of subcarriers that overlap a group of subcarriers to be allocated to the subset of the plurality of antennas during transmission. The signal power of the groups of subcarriers of the multi-carrier signals can be directed to the subset of the plurality of antennas according to receive signal qualities of the characterized pilot tones.

Base station receive signal processing can include, for example, estimating the UL channel. This channel estimation commonly averages the pilots of a group of adjacent subcarriers for the purpose of reducing the effects of additive noise and interference. In general, the channels from the subscriber station antennas to the BS antennas are different in both amplitude and phase. To preclude introducing channel estimation errors due to averaging at the base station, embodiments include avoiding the separation of tiles across subscriber antennas. For the WiMAX system, a useful grouping of subcarriers includes, for example, PUSC UL tiles, wherein PUSC refers to the Partial Usage of Subchannels.

It can be advantageous to assign groups of subcarriers on a tile-by-tile basis. First, the UL tiles span a narrow range of frequencies. Therefore, the channel typically varies by only a small amount across the tile and the channel for all subcarriers within this group can be effectively characterized by a single metric. Additionally, the collection of tiles that make up a subchannel do not change during the UL subframe. This allows assignment of tiles to individual antennas without concern that subsequent assignment, on subsequent symbols, may result in the same tile being transmitted on different antennas on different symbols. This is true even in the case of, for example, subchannel rotation in, WiMAX systems. Subchannel rotation is described in section 8.4.62.6 of the IEEE 802.16 standard. Other useful grouping of subcarriers include the Band AMC bin in the WiMAX standard and the Physical Resource Block (PRB) in the 3rd Generation Partnership Program Long-Term-Evolution (LTE) standard.

Figure 5A:
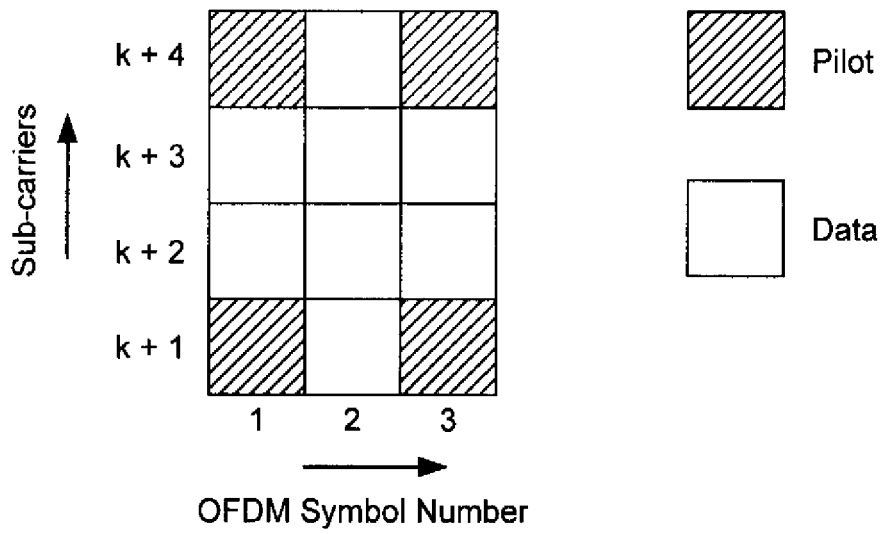
FIG. 5A shows an example of a group of subcarriers that includes pilot subcarriers and data subcarriers over multiple multi-carrier symbols.

FIG. 5A shows an example of a group of subcarriers (for example WiMAX PUSC-tile) that includes pilot subcarriers and data subcarriers over multiple multi-carrier symbols. The PUSC-tile of FIG. 5A includes subcarriers that are defined by subcarriers locations k+1, k+2, k+3, k+4 and by OFDM symbol numbers 1, 2, 3. The tile shown includes pilots at the corners of the tile, and data subcarriers in the remaining locations.

Figure 5B:
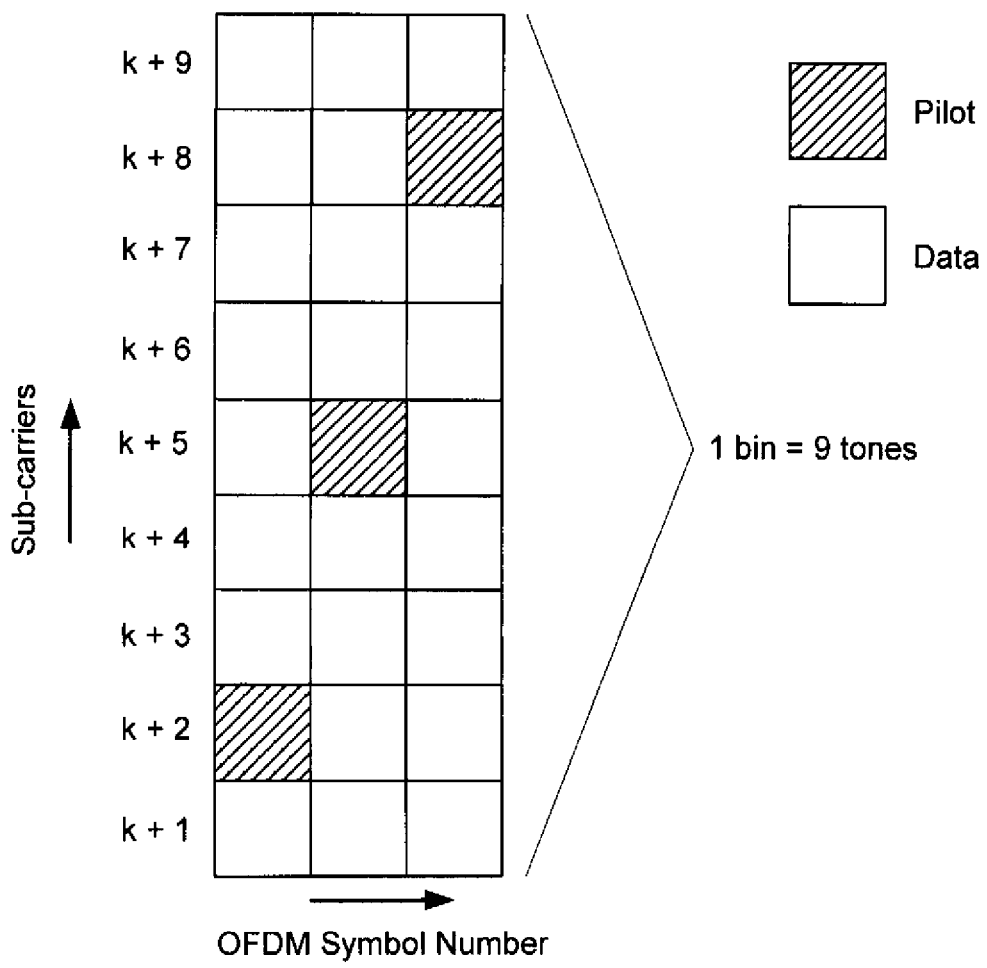
FIG. 5B shows another example of a group of subcarriers that includes pilot subcarriers and data subcarriers over multiple multi-carrier symbols.

FIG. 5B shows another example of a group of subcarriers that includes pilot subcarriers and data subcarriers over multiple multi-carrier symbols. This embodiment is consistent with Band_AMC of the WiMAX standard.

Figure 6:
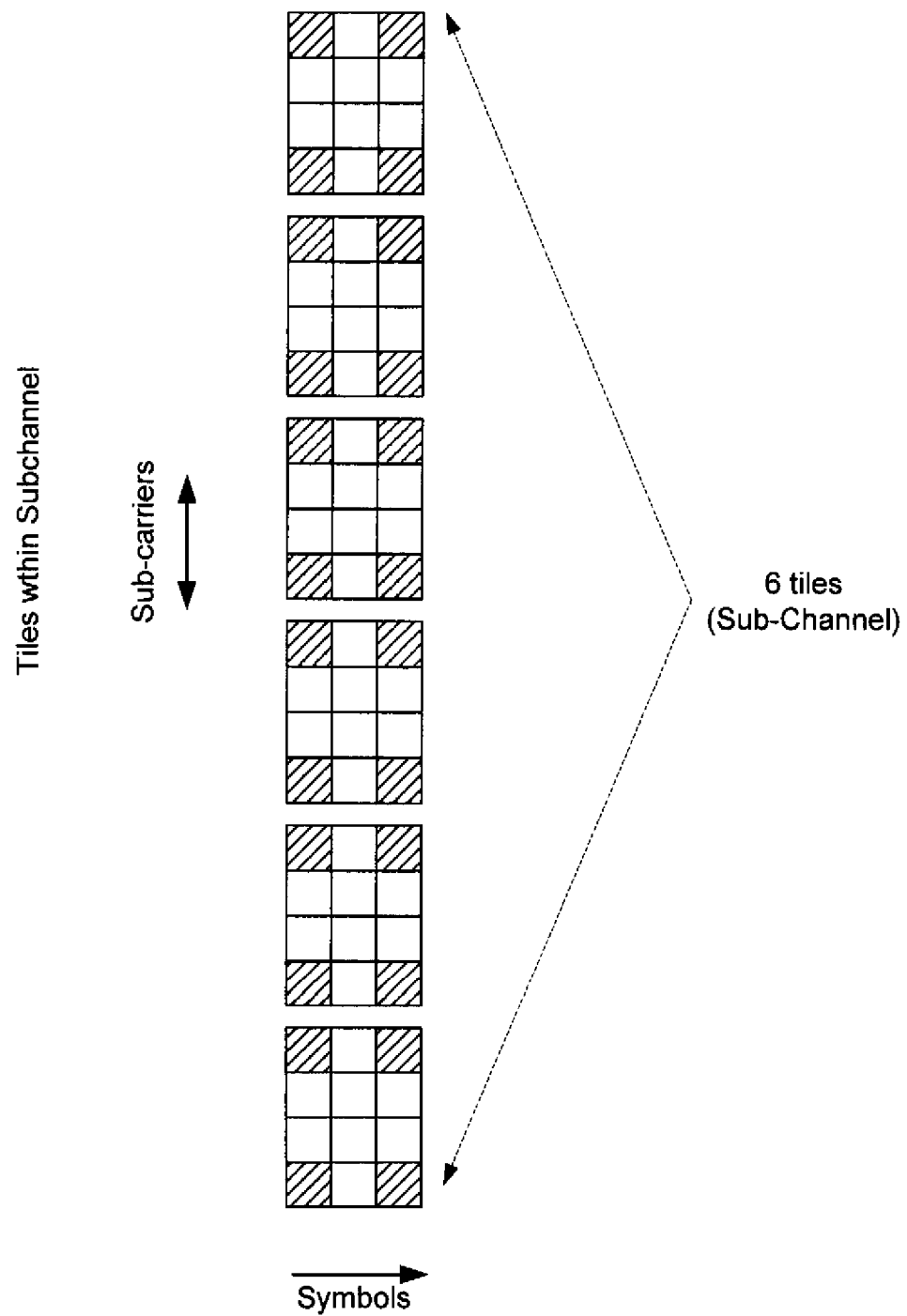
FIG. 6 shows an example of six groups of subcarriers over multiple symbols.

FIG. 6 shows an example of a subchannel that includes six groups of subcarriers over multiple symbols. Each of the tiles includes pilot and data subcarriers which are the same as the tile shown in FIG. 5A. For at least some embodiments, the six tiles constitute a sub-channel. As shown, each tile includes 4 subcarriers and 3 symbols.

Figure 7:
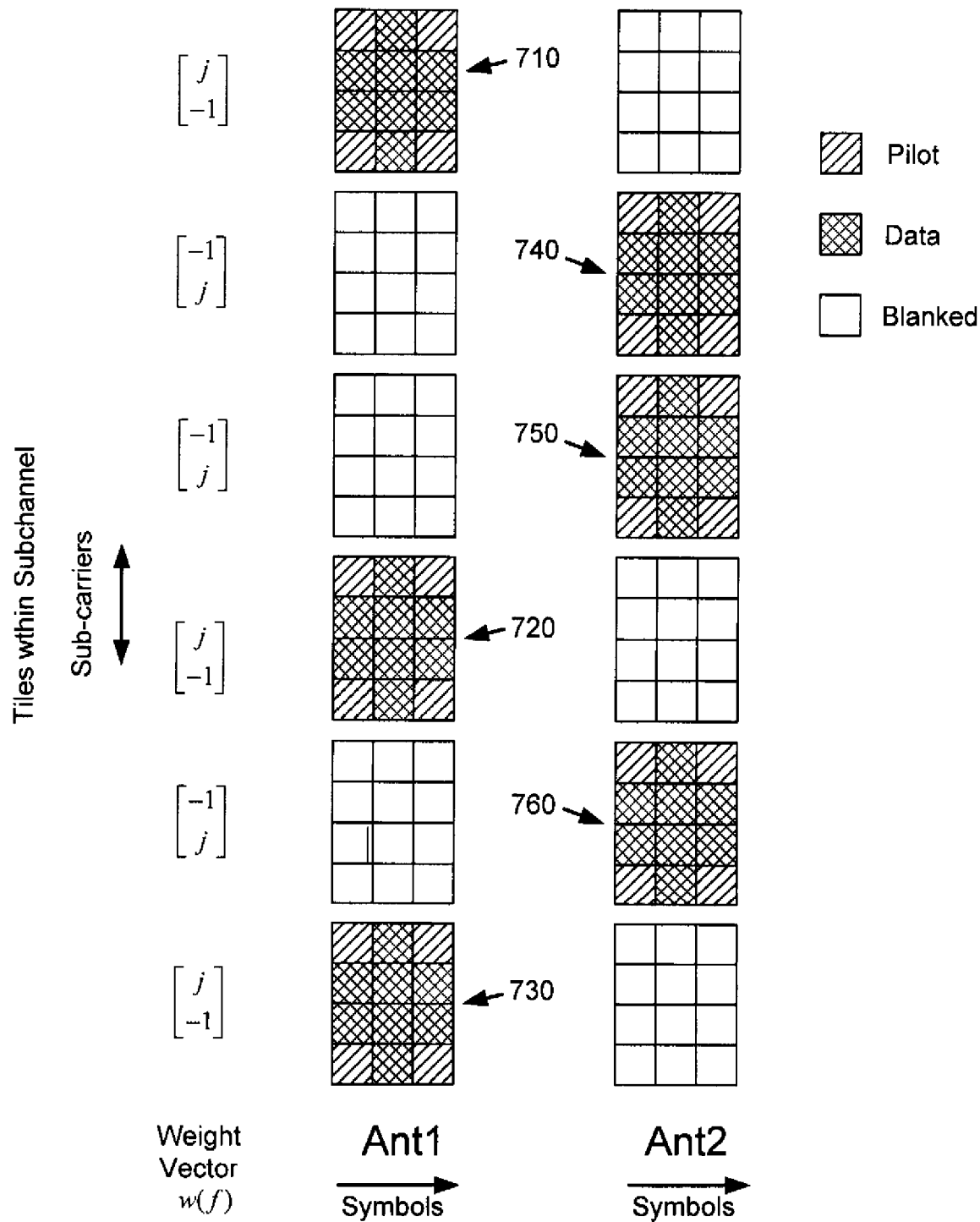
FIG. 7 shows an example of groups of subcarriers that have been allocated between two subscriber station antennas and exemplary per-tile weights.

FIG. 7 shows an example of tiles (groups of subcarriers) that have been allocated between two separate subscriber station transmit antennas. As shown, each antenna (Ant. 1, Ant. 2) have been allocated three out of a possible six tiles. Also as shown, none of the allocated tiles of one antenna overlap in frequency with the allocated tiles of the other antenna. That is, tiles 710, 720, 730 have been allocated to the antenna Ant. 1 and tiles 740, 750, 760 have been allocated to the other antenna Ant. 2. Any of the described embodiments can be used for making the tile allocations between the two antennas. As previously described, the allocations can be over more than two antennas, and can include any number of tiles.

FIG. 7 shows examples of a weight vector W for each tile. That is, for example, the third tile 750 weight vector can be represented by:

$$x(f) = \begin{bmatrix} -1 \\ j \end{bmatrix} s(f).$$

Figure 8:
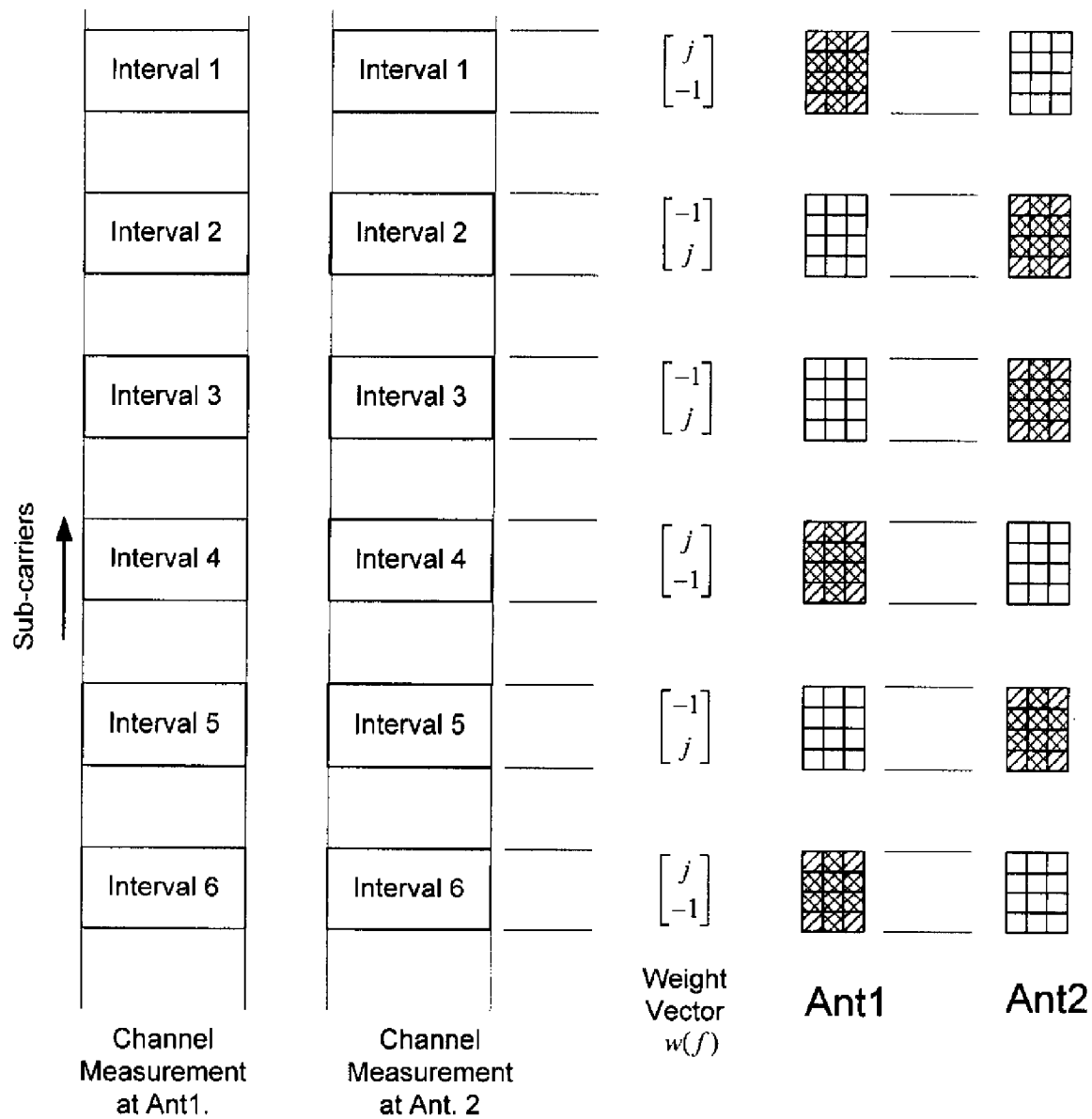
FIG. 8 shows an example of measurements taken over a range of frequencies of the downlink signals, and the corresponding allocating of groups of subcarriers between two subscriber station antennas, based on the measurements.
Figure 9:
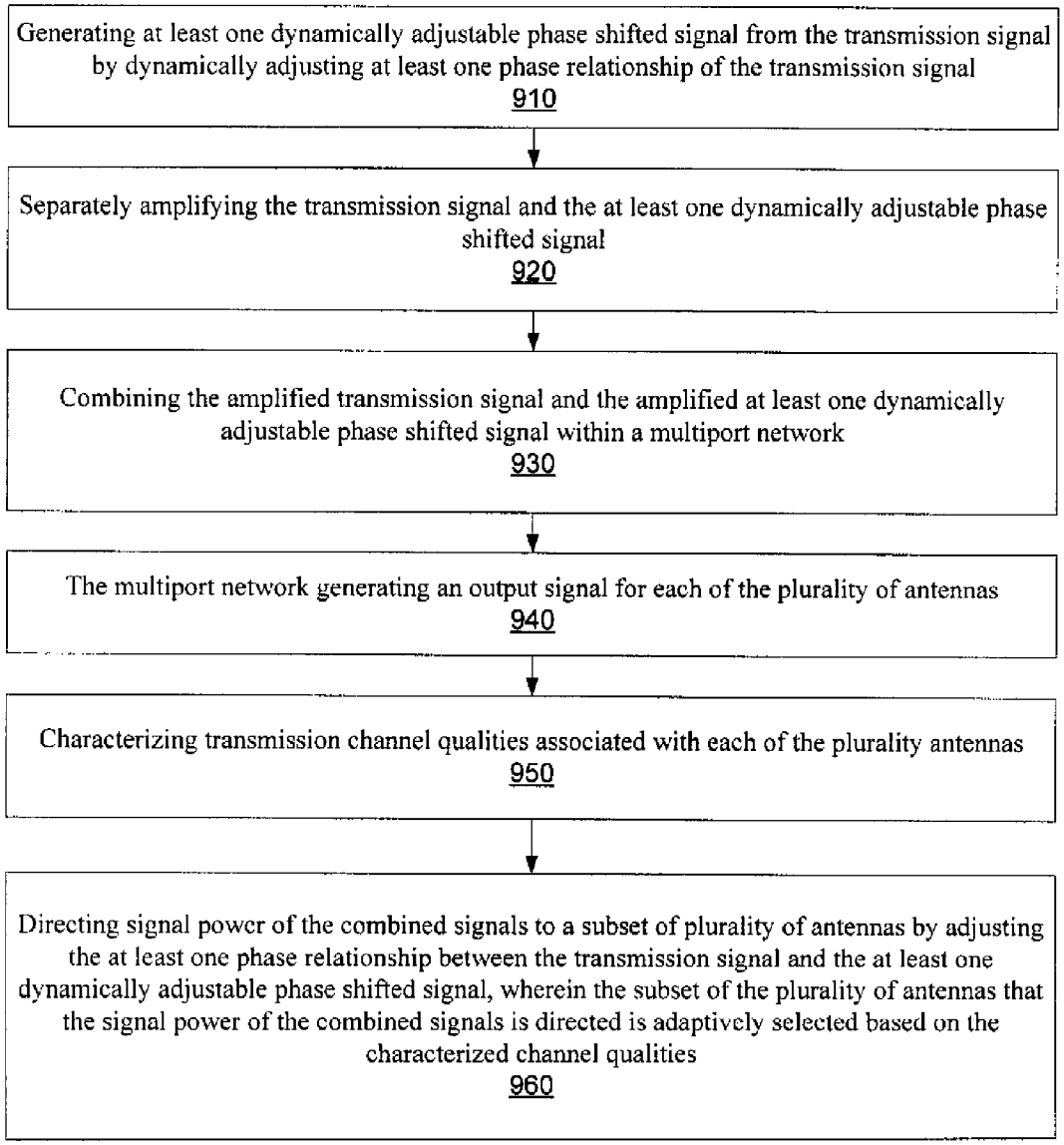
FIG. 9 shows a flow chart that includes steps of another example of a method of transmitting a plurality of transmission signals, wherein transmission signal energy is directed to a subset of a plurality of antennas.

FIG. 8 shows an example of channel measurements taken over a range of frequencies of the downlink signals, and the corresponding allocating of groups of subcarriers (tiles) between two separate subscriber station antennas, based on the measurements. That is, channel measurements are made at both antennas (Ant. 1, Ant. 2) before the allocating the tiles to the antennas. The measurements can be made, for example, during a preamble of a downlink sub-frame. As shown, the measurements are made over each of six intervals (interval1, interval2, interval3, interval4, interval5, interval6) on both of the antennas. Based on the measurements, the groups of subcarriers (tiles) are allocated between the two antennas (Ant. 1, Ant. 2). As shown, none of the allocated tiles of one antenna overlap in frequency with the allocated tiles of the other antenna, FIG. 9 shows a flow chart of steps of an example of a method of transmitting a transmission signal through a plurality of antennas. A first step 910 includes generating at least one dynamically adjustable phase shifted signal from the transmission signal by dynamically adjusting at least one phase relationship of the transmission signal. A second step 920 includes separately amplifying the transmission signal and the at least one dynamically adjustable phase shifted signal. A third step 930 includes combining the amplified transmission signal and the amplified at least one dynamically adjustable phase shifted signal within a multiport network. A fourth step 940 includes the multiport network generating an output signal for each of the plurality of antennas. A fifth step 950 includes characterizing transmission channel qualities associated with each of the plurality antennas. A sixth step 960 includes directing signal power of the combined signals to a subset of plurality of antennas by adjusting the at least one phase relationship between the transmission signal and the at least one dynamically adjustable phase shifted signal, wherein the subset of the plurality of antennas that the signal power of the combined signals is directed is adaptively selected based on the characterized channel qualities.

Figure 10:
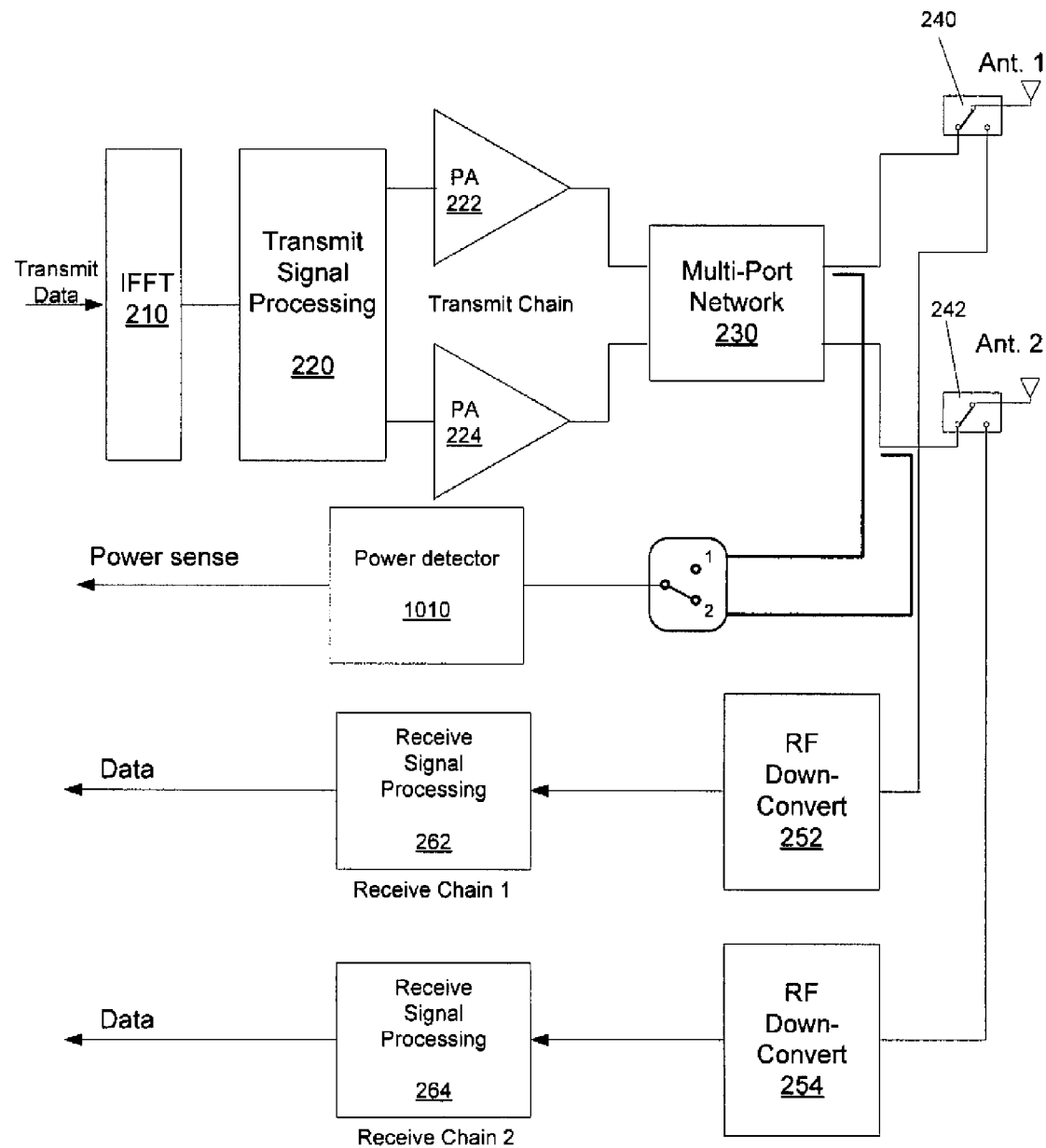
FIG. 10 shows an example of a block diagram of subscriber station transceiver that includes a multiport network, multiple antennas, and power sensing of the outputs of the multiport network.

FIG. 10 shows an example of a block diagram of subscriber station transceiver that includes a multiport network 230, multiple antennas (Ant. 1, Ant. 2), and power sensing of the outputs of the multiport network. The outputs of the multiport network 230 are sensed by coupling the outputs to a power detector 1010. A switch can be included to allow for selection of which of the outputs is sensed by the power detector 1010.

For this embodiment, the phase of the dynamically adjustable phase shifted signal from the transmission signal is selected based on the sensed power level of the least one output of the multipart network. For one embodiment, the phase of the at least one dynamically adjustable shifted signal is selected to minimize the sensed power level of the least one output of the multipart network. This is generally applicable to the multipart network output corresponding to the antenna that is not selected to transmit the majority of the signal power. In another embodiment, both the amplitude and the phase of the dynamically adjustable shifted signal are adjusted to minimize the sensed power level of the least one output of the multiport network. In this embodiment, the residual signal power from the one or more unselected antennas may correspond to amplifier distortion products, which is generally best to minimize. For another embodiment, the phase of the at least one dynamically adjustable shifted signal is selected to maximize the sensed power level of the least one output of the multiport network. This is generally applicable to the multiport network output corresponding to the antenna (or antennas) that is selected to transmit the majority of the transmission signal power. For another embodiment, the phase of the at least one dynamically adjustable shifted signal is selected and an amplitude relationship between the transmission signal and the dynamically adjustable signal is selected to minimize the sensed power level of the least one output of the multiport network.

Figure 11:
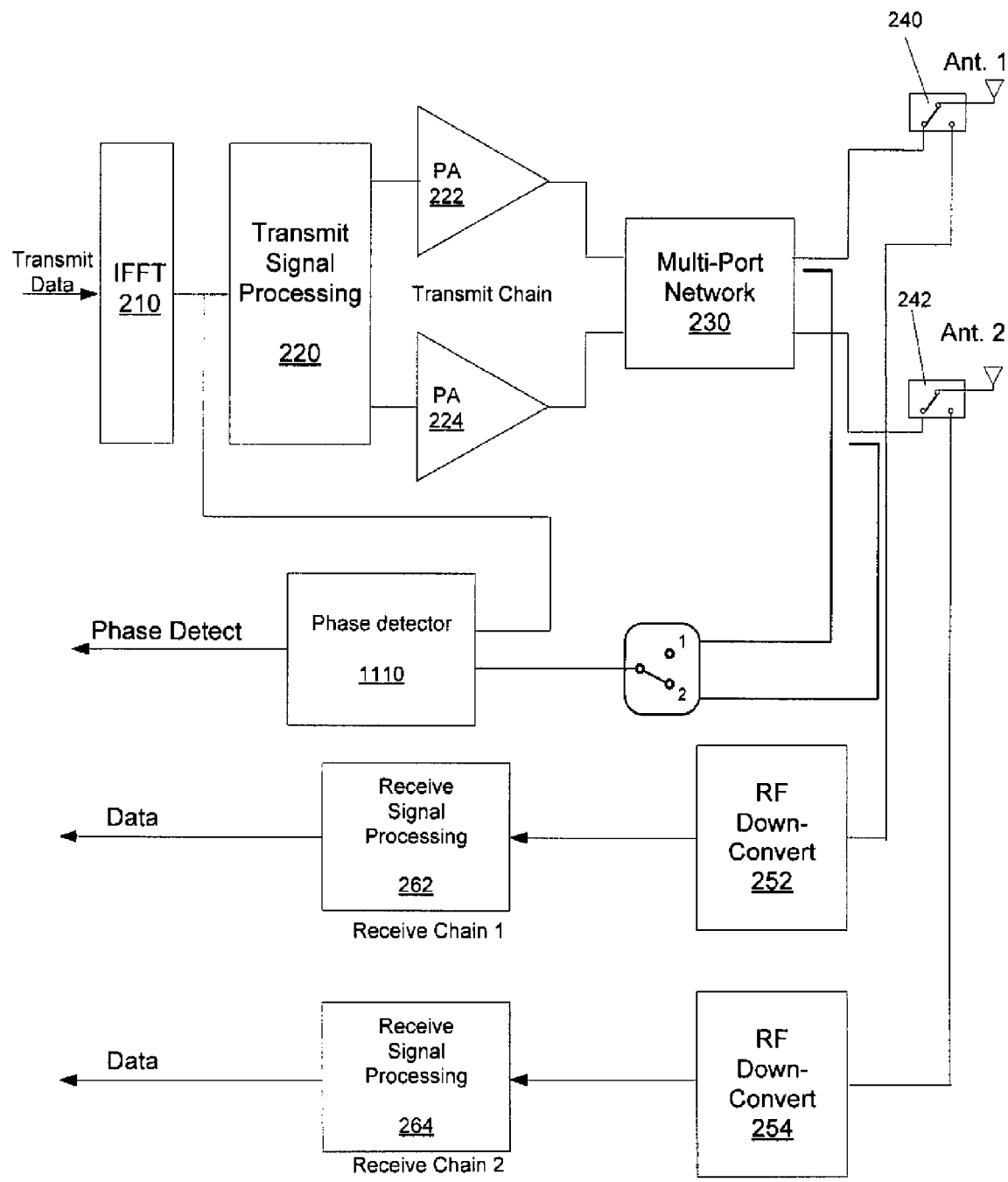
FIG. 11 shows an example of a block diagram of subscriber station transceiver that includes a multiport network, multiple antennas, and phase measurement of the outputs of the multiport network.

FIG. 11 shows an example of a block diagram of subscriber station transceiver that includes a multiport network 230, multiple antennas, and phase measurement of the outputs of the multiport network. The outputs of the multiport network 230 are sensed by coupling the outputs to a phase detector 1020. A switch can be included to allow for selection of which of the outputs is sensed by the phase detector 1020.

For this embodiment, the phase of the dynamically adjustable phase shifted signal from the transmission signal is selected based on the sensed phase of the least one output of the multiport network. The phase can be adjusted according to a calibration table. The calibration table can be pre-determined to maximize power at the at least one output of the multiport network, or alternatively the calibration table can be pre-determined to minimize power at the at least one output of the multiport network. In another embodiment, a plurality of measurements are made and the composite phase relationship of the transmit signal processing, the power amplifiers 222, 224 and the multiport network are determined. In yet another embodiment, this plurality of measurements is used in the selection of the dynamically adjustable phase relationship. In another embodiment, the plurality of measurements plus superposition is used.

Figure 12:
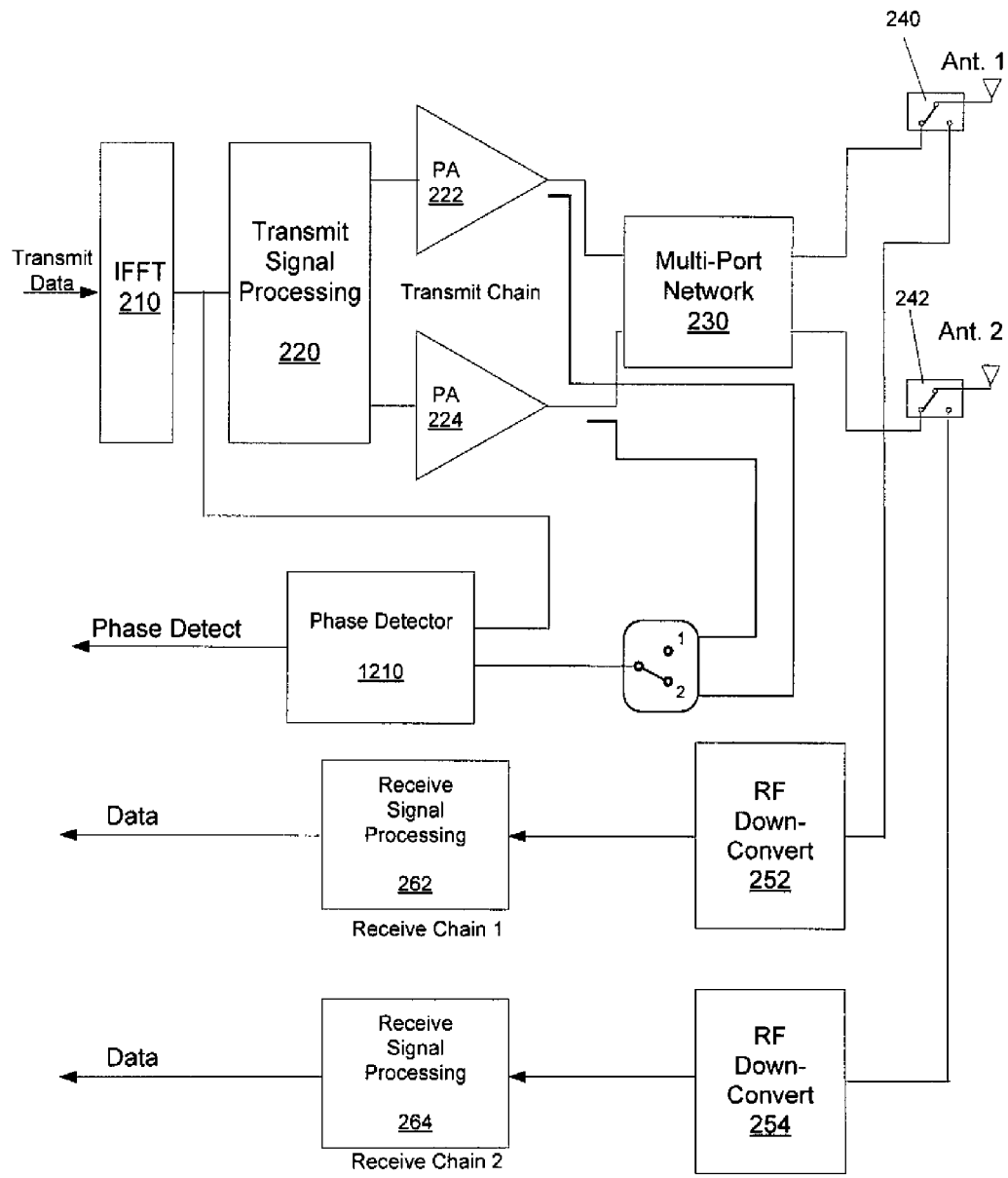
FIG. 12 shows an example of a block diagram of subscriber station transceiver that includes a multiport network, multiple antennas, and phase measurement of the inputs to the multiport network.

FIG. 12 shows an example of a block diagram of subscriber station transceiver that includes a multiport network 230, multiple antennas, and phase measurement of the inputs to the multiport network. The inputs of the multiport network 230 are sensed by coupling the outputs to a phase detector 1030. A switch can be included to allow for selection of which of the inputs is sensed by the phase detector 1030.

For this embodiment, the phase of the dynamically adjustable phase shifted signal from the transmission signal is selected based on the sensed phase of the least one input of the multipart network. Similar to as previously described, the phase can be adjusted according to a calibration table. The calibration table can be pre-determined to maximize power at the at least one output of the multipart network, or alternatively the calibration table can be pre-determined to minimize power at the at least one output of the multipart network Although specific embodiments have been described and illustrated, the embodiments are not to be limited to the specific forms or arrangements of parts so described and illustrated.

What is claimed:

1. A method of transmitting a transmission signal through a plurality of antennas, comprising:
generating at least one dynamically adjustable phase shifted signal from the transmission signal, wherein the generating is based on wireless transmission channel characteristics derived from measurements of signals received via the plurality of antennas;
separately amplifying the transmission signal and the at least one dynamically adjustable phase shifted signal;
combining the amplified transmission signal and the amplified at least one dynamically adjustable phase shifted signal within a multiport network; and
the multiport network generating an output signal for each of the plurality of antennas.

2. The method of claim 1, wherein generating the at least one dynamically adjustable phase shifted signal includes dynamically adjusting at least one phase relationship of the transmission signal.

3. The method of claim 2, further comprising directing a majority of signal power of the combined signals to a subset of the plurality of antennas as determined by the adjusting of the at least one phase relationship between the transmission signal and the at least one dynamically adjustable phase shifted signal.

4. The method of claim 3, wherein the subset of plurality of antennas that the majority of signal power of the combined signals is directed to is adaptively selected over time.

5. The method of claim 2, wherein the transmission signal and the at least one dynamically adjustable phase shifted signal are multi-carrier signals, wherein each of the multi-carrier signals comprises a plurality of sub-carriers.

6. The method of claim 5, further comprising adaptively directing a majority of signal power of the combined signals to a subset of plurality of antennas on a sub-carrier by sub-carrier basis as determined by the adjusting of the at least one phase relationship between the transmission signal and the at least one dynamically adjustable phase shifted signal.

7. The method of claim 6, further comprising characterizing transmission channel qualities associated with each of the antennas.

8. The method of claim 7, further comprising adaptively selecting the subset of the plurality of antennas that the majority of the signal power of the combined signals is directed is based on the characterized transmission channel qualities.

9. The method of claim 8, wherein the transmission channel qualities are characterized across the subcarriers of the multi-carrier signals.

10. The method of claim 9, further comprising tiles that include multiple subcarriers of multi-carrier symbols.

11. The method of claim 9, further comprising adaptively selecting the subset of the plurality of antennas that the majority of the signal power of the combined signals is directed based on a tile-by-tile basis.

12. The method of claim 8, wherein characterizing transmission channel qualities associated with each of the antennas comprises characterizing the transmission channel qualities based on reception of signals through each antenna.

13. The method of claim 12, wherein characterizing transmission channel qualities associated with each of the antennas comprises characterizing pilot tones of a preamble of a downlink sub-frame of the received signals.

14. The method of claim 13, wherein characterizing the pilot tones of the preamble is based on subcarriers of the preamble corresponding to a group of subcarriers to be allocated during transmission.

15. The method of claim 14, wherein characterizing the pilot tones of the preamble occurs over a range of subcarriers that overlap a group of subcarriers to be allocated to the subset of the plurality of antennas during transmission.

16. The method of claim 15, wherein signal, power of the groups of subcarriers of the multi-carrier signals is directed to the subset of the plurality of antennas according to receive signal qualities of the characterized pilot tones.

17. The method of claim 1, wherein the multi-port network comprises a hybrid coupler that combines the amplified transmission signal and the at least one dynamically adjustable phase shifted signal, and generates an output signal for each of the plurality of antennas.

18. The method of claim 1, wherein combining the amplified transmission signal and the amplified at least one dynamically adjustable phase shifted signal comprises:
   delaying each amplified transmission signal before combining, wherein the delays are predetermined; and
   generating a plurality of combined outputs, wherein a combined output corresponds with each of the plurality of antennas.

19. The method of claim 1, further comprising:
   sensing a power level of at least one output of the multiport network; and
   generating the at least one dynamically adjustable phase shifted signal from the transmission signal based on the sensed power level of the at least one output of the multiport network.

20. The method of claim 19, wherein a phase of the at least one dynamically adjustable phase shifted signal is selected to minimize the sensed power level of the at least one output of the multiport network.

21. The method of claim 19, wherein a phase of the at least one dynamically adjustable phase shifted signal is selected to maximize the sensed power level of the at least one output of the multiport network.

22. The method of claim 19, wherein a phase of the at least one dynamically adjustable phase shifted signal is selected and an amplitude relationship between the transmission signal and the dy,amically, adjustable phase shifted signal is selected to minimize the sensed power level of the at least one output of the multiport network.

23. The method of claim 1, further comprising:
   sensing a phase of at least one output of the multiport network; and
   generating the at least one dynamically adjustable phase shifted signal from the transmission signal based on the sensed phase of the at least one output of the multiport network.

24. The method of claim 1, further comprising:
   sensing a phase of at least one input of the multiport network; and
   generating the at least one dynamically adjustable phase shifted signal from the transmission signal based on the sensed phase of the at least one input of the multiport network.

25. The method of claim 1, further comprising receiving a signal through at least one of the plurality of antennas, bypassing the multiport network, and receive processing the received signal.

26. A method of transmitting a transmission signal through, a plurality of antennas, comprising:
   generating at least one dynamically adjustable phase shifted signal from the transmission signal by dynamically adjusting at least one, phase relationship of the transmission signal, wherein the generating is based on wireless transmission channel characteristics derived from measurements of signals received via the plurality of antennas;
   separately amplifying the transmission signal and the at least one dynamically adjustable phase shifted signal;
   combining the amplified transmission signal and the amplified at least one dynamically adjustable phase shifted signal within a multiport network;
   generating, by the multiport network, an output signal for each of the plurality of antennas;
   characterizing transmission channel qualities associated with each of the plurality antennas; and
   directing a majority of signal power of the combined signals to a subset of plurality of antennas by the adjusting the at least one phase relationship between the transmission signal and the at least one dynamically adjustable phase shifted signal,
   wherein the subset of the plurality of antennas that the signal power of the combined signals is directed is adaptively selected based on the characterized channel qualities.

27. A transceiver, comprising:
   means for generating at least one dynamically adjustable phase shifted signal from a transmission signal;
   a first amplifier for amplifying the transmission signal and a second amplifier for amplifying the at least one dynamically adjustable phase shifted signal; and
   a multiport network configured to combine the amplified transmission signal and the amplified at least one dynamically adjustable phase shifted signal, and configured to generate an output signal for each of a plurality of antennas,
   wherein the means for generating is configured to generate the at least one dynamically adjustable phase shifted signal based on wireless transmission channel characteristics derived from measurements of signals received via the plurality of antennas.

28. The transceiver of claim 27, wherein the multiport network comprises a hybrid coupler.

29. The transceiver of claim 27, further comprising:
   a receiver configured to receive a signal through at least one of the plurality of antennas, wherein the receiver is configured to output the received signal by bypassing the multipart network; and
   a processor configured to process the received signal.

* * * * *

UNITED STATES PATENT AND TRADEMARK OFFICE
CERTIFICATE OF CORRECTION

PATENT NO. : 8,737,529 B2
APPLICATION NO. : 12/689058
DATED : May 27, 2014
INVENTOR(S) : Hochwald et al.

Page 1 of 1

It is certified that error appears in the above-identified patent and that said Letters Patent is hereby corrected as shown below:

In the Claims

In column 12, line 62, replace "signal, power" with --signal power--.

In column 13, line 30, replace "dy,amically, adjustable" with --dynamically adjustable--.

In column 13, line 52, replace "through, a" with --through a--.

In column 14, line 3, replace "one, phase" with --one phase--.

In column 14, line 19, replace "of plurality" with --of the plurality--.

Signed and Sealed this
Fifth Day of August, 2014

Michelle K. Lee
*Deputy Director of the United States Patent and Trademark Office*